United States Patent [19]
Fontaine

[11] 3,894,348

[45] July 15, 1975

[54] RELATOR SIMULATOR SYSTEM

[75] Inventor: Robert R. Fontaine, Riverdale, Md.

[73] Assignee: The United States of America as represented by the Secretary of the Navy, Washington, D.C.

[22] Filed: Dec. 19, 1966

[21] Appl. No.: 603,065

[52] U.S. Cl. .............................................. 35/10.4
[51] Int. Cl.² ........................................... G09B 9/00
[58] Field of Search .................................... 35/10.4

[56] References Cited
UNITED STATES PATENTS

| | | | |
|---|---|---|---|
| 3,610,798 | 10/1971 | Murphree | 35/10.4 |
| 3,649,735 | 3/1972 | Coburn et al. | 35/10.4 |
| 3,764,720 | 10/1973 | Peterson | 35/10.4 |
| 3,835,234 | 9/1974 | Murphree | 35/10.4 |

*Primary Examiner*—T. H. Tubbesing
*Attorney, Agent, or Firm*—R. I. Tompkins; J. W. Pease; H. A. David

[57] ABSTRACT

A system for simulating the relator feature of antisubmarine warfare sonar equipment wherein the operator is enabled to match a bearing line on a Codargram with the corresponding frequency line selected from the Lofargram for target signals in a low frequency range and set into a dial, the relator simulator system comprising a three cycle gate generator for generating gating signals of a width corresponding to three cycles of a dialed frequency, audio generator means for producing the dialed frequency, and audio gate means, the three cycle gate signals being operative to enable pulses from Lofar simulation to control the audio generator means to produce the selected frequency irrespective of inaccuracies in setting the dial, and the audio gate means being responsive to the presence of simulated target signals to pass the audio signals from the generator means to Codar simulation means.

6 Claims, 4 Drawing Figures

RELATOR SIMULATOR SYSTEM

This invention relates to simulator apparatus for training personnel in the operation and tactical use of certain antisubmarine warfare sonar equipment. More particularly the invention is directed to a relator simulator system which simulates the relator function of existing operational equipment. In this regard the relator function serves to relate target (e.g. an enemy submarine) data derived from one type of sonar detection equipment to target data derived from another type of sonar equipment.

Various sonar techniques are utilized in detecting, identifying, and accurately locating submarines. A general understanding of two of these techniques is essential to an understanding of the invention. One technique known as Lofar (Low Frequency Analyzing Recorder) is that of passive listening for the various low frequency (10–200 cps) sounds emitted by submarines, which sounds may be analyzed, as by a sound spectrum analyzer, for characteristic identifying frequencies from which a class of submarines or even a specific boat may be identified. The output of such a spectrum analyzer may be presented on the sensitized paper recording chart of a suitable recorder. Obviously, this low frequency analyzing technique is most useful for detection and identification.

Another passive sonar technique, known as Codar (Correlation Detector Analyzer Recorder), utilizes pairs of sonobouys and is more useful for determining accurate lines of bearing for each of one or more target submarines. The sonobouys are dropped along a base line determined by the dropping aircraft flight path with the estimated positions of one or more target submarines to one side of the base line. Because of known physical spacing between the bouys, sounds emitted by a target arrive at the bouys with definite time delays which depend on target location. By detecting the time delays or out-of-phase condition of the received sound signals with suitable signal comparator equipment, the signals from each of the sonobouys may be correlated and presented as a line of bearing on a sensitized paper of the same recorder used in the Lofar system. The line of bearing will angularly deviate from a line normal to the base line in a direction toward the sonobouy which is closer to the target. By utilizing two pairs of sonobouys, intersecting lines of bearing may be determined to thereby fix the position of the target. The graphic display of the bearing lines is known as a Codargram.

In order to relate the identifying frequencies from several targets displayed as a Lofargram to the bearing lines of several targets as displayed as a Codargram, operational equipment for carrying out the Lofar and Codar techniques includes relator means whereby the operator may dial a target frequency taken from the Lofargram, and a series of parallel lines (Relatorgram) will appear superimposed on the Codargram. When Relatorgram lines are parallel to a bearing line of the Codargram, and one of the Relatorgram lines is coincident with that bearing line, that bearing line is identified as being for the target which produced the dialed frequency taken from the Lofargram.

Simulation of each of the Lofar and Codar systems requires the generation of synthetic target signals of various types associated with submarine activities such as propeller beat, generator and motor noises, etc. In the case of Lofar simulation, the 10 to 200 cps band of audio frequencies generated by an operating submarine is not simulated by an audio signal in the trainer. Instead, digital pulses are generated as a function of time. As the recorder stylus moves across the paper, the timed pulses cause marks to appear on the paper at positions corresponding to the simulated frequencies.

Codar operational equipment, as mentioned above, detects the time delay or out-of-phase condition of sounds emitted by a target and arriving at each of a pair of bouys at different times. A correlator compares the signals from each bouy and emphasizes the point or points of correlation by increasing the voltage on the inscribing styli of the associated recorder. This causes a darkening on the lines inscribed by the styli and produces the mentioned lines of bearing on the Codargram. To simulate Codar operation, signals are generated by noise generators and propeller beat generators and fed to three special magnetic tape recorders (one for each target) which are used to simulate signal delays. Each of these recorders comprises erasing and recording head means which are movable with respect to playback head means and other erasing and recording head means which are fixed with respect to playback head means. The center of travel of the movable erase and recording head means is equal to the time delay provided by the fixed erase and recording head means and the associated playback head means. The movable head means are positionable by rotary delay shaft means to simulate different delay times corresponding to different target positions. The delayed signals from the playback heads are correlated by comparator means which operated in conjunction with a reference signal generator to provide signals to the recorder which produces the mentioned Codargram. Accordingly, positioning of the mentioned delay shafts of the magnetic tape recorder means determines the bearing lines traced by the Codargram and Relatorgram producing recorder.

It is a primary object of this invention to provide, in apparatus for simulating the above described operational equipment, a novel relator simulator system for realistically simulating the relator function of the operational equipment.

Another object of this invention is the provision of a relator simulator system which automatically compensates for inaccuracies of the student in dialing a frequency selected from a simulated Lofargram.

Yet another object is the provision of a relator simulator system which is reliable in operation and will permit the complete simulation of related Lofar and Codar systems as used in tactical situations, thereby realizing all those well known economies and advantages attendant the use of simulation equipment rather than actual operational equipment.

As another object this invention aims to accomplish the foregoing through the provision of a novel relator simulation system which provides the proper audio signals for application to the delay shaft positioning means of the magnetic tape recording apparatus of the Codar simulation apparatus, comprising a three cycle gate generator which generates gating signals of a width corresponding to three cycles of the frequency actually dialed by a trainee, an audio generator for producing the dialed frequency, and an audio gate. The three cycle gate generator is responsive to the frequency the student has selected and enables the pulses from the simulated Lofar circuitry to control the audio generator portion of the relator simulator, while the audio gate is responsive to the presence of target signals to pass the generated audio to the pair delay shaft means of the Codar simulation system, thereby effecting the proper Relatorgram.

Other objects and advantages of the invention will become apparent from the following detailed description taken in conjunction with the accompanying sheets of drawings forming a part of this specification, and in which.

Figure 1:
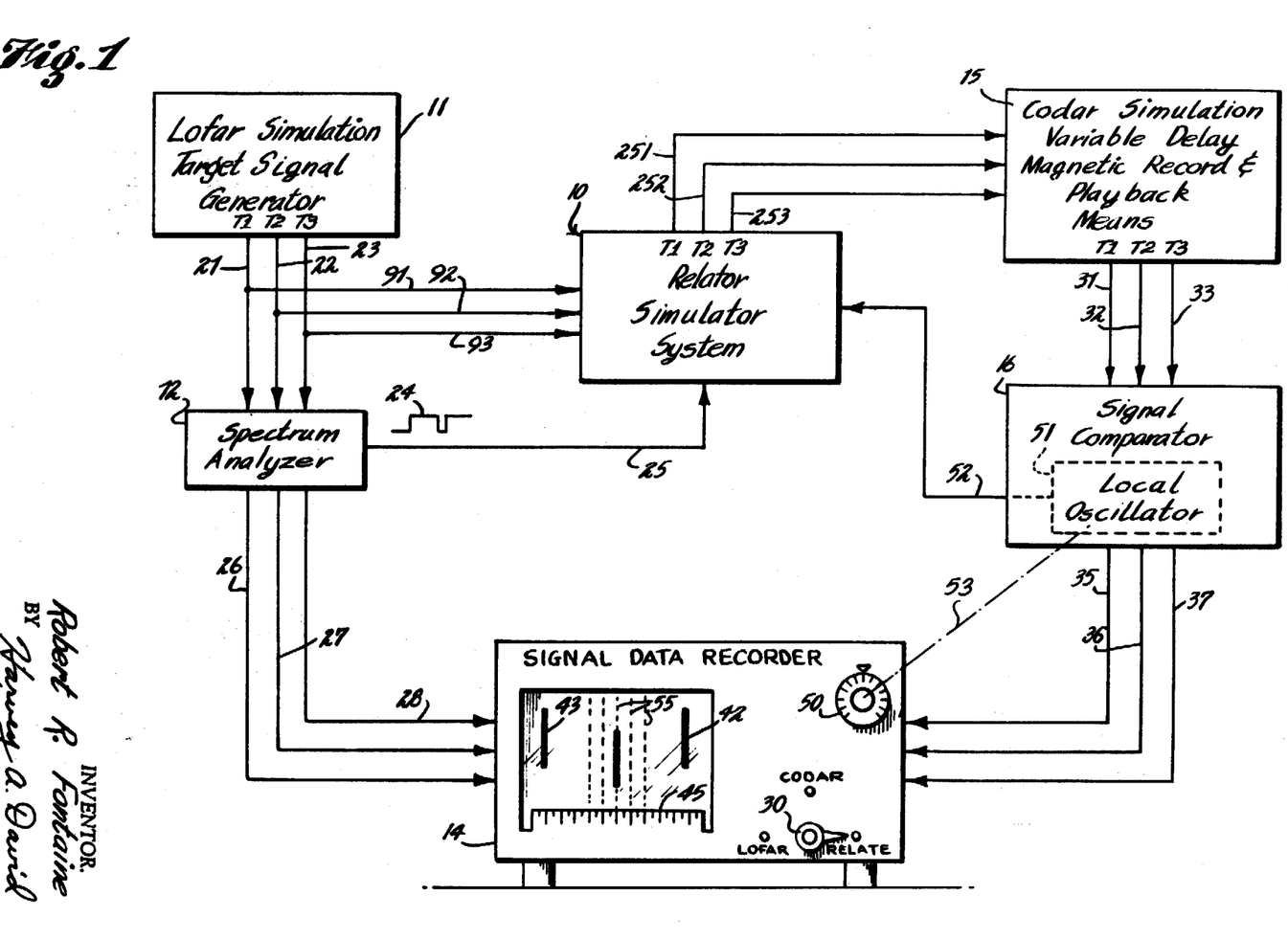
FIG. 1 is a functional block diagram of a training device showing the relationship of a relator simulation system embodying the invention to Lofar and Codar simulation systems.

Referring now to FIG. 1, the reference numeral 10 indicates generally a relator simulator system embodying the present invention and shown in association with a Lofar simulation target signal generator 11, a spectrum analyzer 12, a data signal recorder 14, a Codar simulation variable delay record and playback means 15, and a signal comparator 16, all of which go together to provide a training apparatus useful in the instruction of personnel in the use of Lofar and Codar submarine detection and locating techniques.

The Lofar simulation target signal generator 11 does not actually produce audio signals like those emanated by the targets, but instead produces digital pulses representing sounds emanating from one or more targets represented as T1, T2, and T3 on the generator 11. The target signal output pulses from generator 11 are carried by suitable conductor means represented by lines 21, 22 and 23, respectively to the spectrum analyzer which produces a synchronizing pulse waveform 24 which is applied as an input via line 25 to the relator system 10. The target signals are passed by the spectrum analyzer 12 via lines 26, 27 and 28, to the signal data recorder 14.

The data recorder 14 comprises suitable mode selector means such as selector knob 30 by which any one of Lofar, Codar, or Relate modes of operation may be selected. When Lofar operation is selected, the incoming target signals are utilized by the recorder 14 to produce a Lofargram (not shown) which graphically indicates those frequencies in the 10 to 200 cps band which are present in the sounds emitted by the targets T1, T2 and T3 under surveillance.

Having approached a target by means of the Lofar mode of operation, the trainee further narrows the target search by activating the equipment associated with the Codar mode of operation. Thus, the selector knob 30 would be positioned to select the Codar mode during which the Codar simulation variable delay magnetic record and playback means 15 provides simulated delayed target signals via suitable conductor means represented by lines 31, 32 and 33 to the signal comparator 16. The comparator 16 detects correlations in target signals from simulated bouy pairs and provides corresponding output pulses for the three targets via lines 35, 36 and 37 to the data signal recorder 14. The styli of the recorder 14 mark on the moving sensitized recording paper thereof in response to the correlation pulses. The resulting traces, or Codargram present an indication of the relative bearing of each of the three targets with respect to the course of the sonobouy dropping aircraft along an imaginary base line and taken from a point midway between the bouys. The bearing indicating traces are indicated at 41, 42, and 43 in FIG. 1, for the targets T1, T2, and T3, respectively. A target which is equidistant from both bouys would appear at 90° relative bearing as indicated by a bearing scale 45 on the recorder, while greater or lesser relative bearings will be indicated for targets on one side or the other of an imaginary line which is normal to the center of the imaginary base line extending between the sonobouy pair.

The trainee now knows from the Lofargram that there are three identifiable targets in the area, and from the Codargram that there is a target at each of the bearings indicated. However, he does not know which of the targets identified by the Lofargran is at which bearing. Accordingly, he turns the selector knob 30 to the RELATE position illustrated, and sets into a dial 50 a frequency in the range of 15 to 150 cps selected from the Lofargram as being characteristic of target T1 for example, for a reason which will become apparent as the description proceeds. At this point the relator simulator system 10 of the invention, described more fully hereinafter, comes into play and generates audio frequency outputs which are connected via lines 251, 252 and 253 to the Codar variable delay record and playback means 15 such that the outputs of the latter will cause the recorder 14 to trace a series of lines 55 parallel to, and one coincident with, the target bearing line of the Codargram corresponding to the target which produced the frequency selected from the Lofargram and dialed on dial 50. This series of lines (Relatorgram) relates the target identification with the bearing line.

Figure 2A:
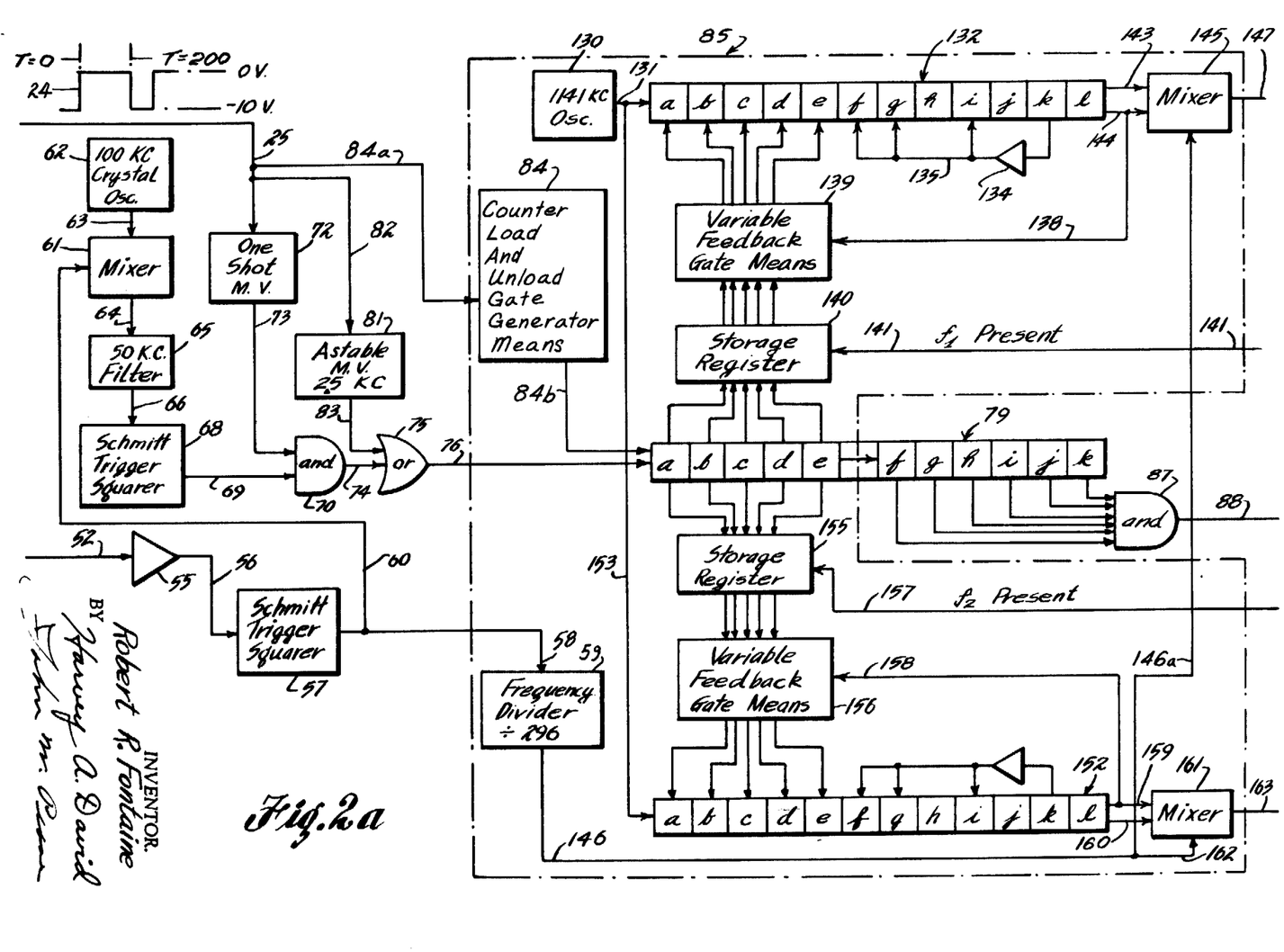
FIGS. 2a and 2b constitute a functional block diagram of the relator simulation system itself.
Figure 2B:
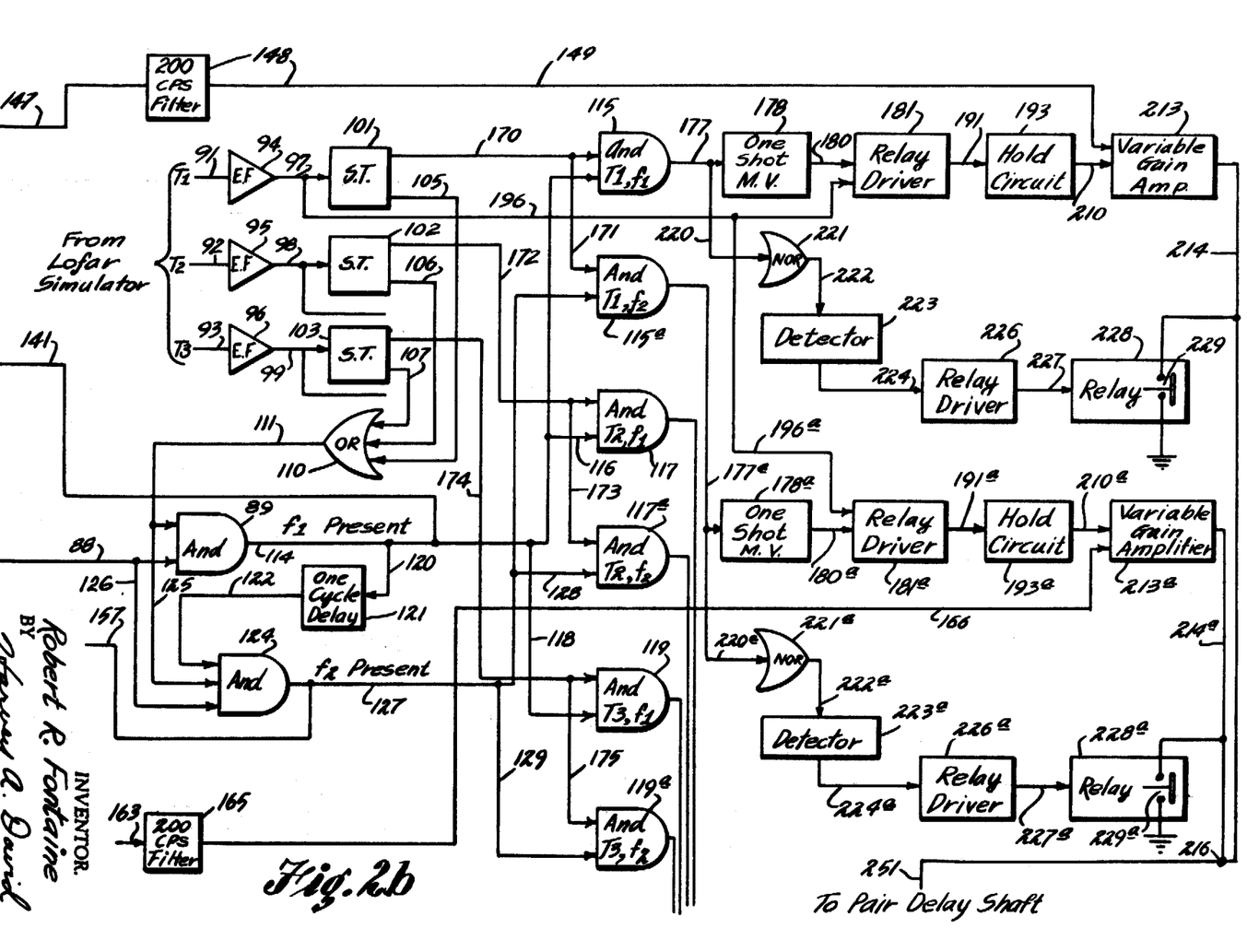

The relator simulator system 10 will now be described in greater detail with reference to FIG. 2.

The simulated relator system receives as two of its inputs the synchronizing pulse waveform 24 on line 25 from the spectrum analyzer 12, and a local oscillator signal on line 52 from a local oscillator 53 forming part of the signal comparator 16 of FIG. 1.

The synchronizer pulse waveform 24 varies in amplitude from ground to approximately -100 volts in the present example. Time $T_o$ is when the spectrum analyzer 12 sweeps through zero. At time $T_{200}$ the spectrum and analyzer 12 is at the 200 cycles per second end of its sweep and begins to return to zero. During this return to zero (flyback time) the styli of the signal data recorder 14 are also returning to zero. In the present example the styli of the recorder 14 sweep the 10 cps to 200 cps recording range in about five-sixths of a second (the period from $T_0$ to $T_{200}$) and require about one-sixth of a second fly-back time.

The local oscillator signal ($f_{Lo}$) on line 52 is a sine wave in the frequency range of 104.44 to 144.4 kc. The osilator operates at 100 kc above a frequency which is 296 times the target signal frequency as selected by the trainee from the Lofargram and set in on the dial 50 which is indicated at 53 as being connected to the signal comparator 16 and controls operation of the local oscillator when the apparatus is in the RELATE mode. In the signal comparator 16 the target signal frequency is multiplied by a factor of 296 and then beat against the local oscillator to produce a 100 kc I.F. signal. The local oscillator frequency can thus be expressed as $f_{Lo} = 100$ kc $+ 296f$ dial.

The local oscillator input line 52 is connected to an isolation amplifier 55 which has its output side connected by line 56 to a Schmitt trigger squarer 57 which is in turn connected by line 58 to a frequency divider in the form of a nine-stage binary counter 59, the purpose of which will later become apparent.

The Schmitt trigger squarer also has its output side connected by line 58 and a line 60 which applies the squared signal of local oscillator 51 as one input to a mixer 61.

The mixer 61 has as another input a 100 kc signal provided by a suitable crystal oscillator 62 which is connected by line 63 to the mixer. The output of the mixer 61 on line 64 is fed to a 50 kc low pass filter 65 which passes only the difference frequencies between the inputs to the mixer 61. Since the inputs to the mixer 61 were 100 kc from oscillator 62 and 104.44 kc to 144.4 kc depending on the target signal frequency selected by the trainee, the frequency passed by the filter 65 will be in the range of 4.44 kc to 44.4 kc or 296 times the frequency of dial 50.

The output of the low pass filter 65 is applied via line 66 to the input side of a Schmitt trigger squarer 68 which squares the 296 $f$ dial signal passed by the filter 65.

The Schmitt trigger squarer 68 is connected by line 69 to an AND gate 70 which receives the squared 296 $f$ dial signal as one input thereto. This signal is a series of pulses at a frequency proportional to the center of the Relator pass band as selected by setting dial 50. Thus if the Relator dial 50 were set at 15 cps, the signal applied on line 69 to AND gate 70 would be a series of pulses at 4,440 cps, and if the dial were set at 150 cps the signal would be at 44,400 cps.

The other input to AND gate 70 is a 33,784 microsecond gate signal derived from a one shot multivibrator 72 which is connected to line 25 so as to be controlled by the sync waveform 24. The one shot multivibrator is triggered to initiate the 33,784 microsecond gate signal at the time $T_{200}$ of the sync waveform and is connected by line 73 to the AND gate 70.

The AND gate 70 is connected by line 74, an OR gate 75, and a line 76 to the input side of an eleven-stage up-down counter 79 which forms part of the mentioned three cycle gate generator means. The purpose of the 33,784 microsecond gate signal from one shot multivibrator 72 is to allow the 4.44 kc to 44.4 kc pulse signal from Schmitt trigger squarer 68 to load the eleven-stage counter 79 through OR gate 75 with 0.33784 × 297 × $f$ dial 50 (or 10 × $f$ dial 50) pulses. This places the counter 79 in a condition ready to be unloaded. Unloading of the counter 79 is accomplished by an astable multivibrator 81 which is connected by line 82 to line 25 carrying the synchronizer waveform 24. The multivibrator 81 operates at 2.5 kc and is keyed on at time $T_0$ of the synchronizer waveform. It thereby provides a series of unloading trigger pulses via line 83 and OR gate 75 to the counter 79, which cause it to unload.

The 2.5 kc rate of operation permits the highest expected count of 2000 pulses (10 × $f$ dial 50 pulses with dial 50 set at 200) to be unloaded in 2,000/5,000 second which is within the previously mentioned 5/6 second sweep period of each recorder cycle.

The counter 79 must, of course, be conditioned to accept the loading pulses and unloading pulses and this may be accomplished by any means well known to those skilled in the art to which the invention pertains.

Thus, a counter load and unload gate generator means 84 is connected by line 84$a$ to line 25 carrying the synchronizer waveform 24 and by line 84$b$ to the counter 79. The gate generator means 84 is responsive to the synchronizer waveform to provide a load gate signal, e.g., a first predetermined voltage level, to the counter 79 for a first predetermined period of the recorder sweep cycle, and an unload gate signal, e.g., a second predetermined voltage level, for a second predetermined period of the recorder cycle. The counter 79 may thereby be conditioned to count up or load while conditioned by the first voltage level and to count down or unload while conditioned by the second voltage level.

The counter 79, which forms part of the earlier mentioned three cycle gate generator means, comprises eleven flip-flops 79$a$ – 79$k$, the outputs of the first five of which control an audio generator, generally indicated at 85, in a manner and for a purpose which will become apparent as the description proceeds. The output from the fifth flip-flop 79$e$ also drives the six remaining flip-flop stages 79$f$-79$k$ at the rate of $½^5$ times the input frequency or one pulse out for every 32 pulses in. A six-input AND gate 87 senses the state of each of these last six flip-flop stages. When all the six stages are in a +1 condition, the AND gate 87 produces an output gate signal on line 88 connected to an AND gate 89. This gate signal is produced once for each cycle of the counter 79 and hence once for each recording cycle of the recorder 14. The duration of the gate signal or pulse is approximately the length of time for the spectrum analyzer 12 and recorder 14 to sweep three cycles of the 10 to 200 cps range of simulated target signals. Thus, the counter 79 and AND gate 87 comprise a gate pulse generator and the output thereof is referred to as a "three cycle gate pulse." It is at time $T_0$ of the synchronizer waveform that the astable multivibrator 81 is triggered to cause the counter 79 to unload. When the number of unload pulses equal the number of pulses previously loaded, the gate generator produces its three cycle gate pulse.

Because the number of pulses loaded into the counter 79 depends upon the target frequency selected by the trainee and set into dial 50, and since the number of counter input pulses loaded and unloaded is greater or lesser as the selected frequency is higher or lower, the three cycle gate pulse interval will occur at a time in the sweep of the spectrum analyzer 12 such that a target signal simulation pulse from the Lofar simulation signal generator 11 should occur at the center of the three cycle gate interval. Because of practical limitations of the simulation equipment and inability of trainees to precisely read a frequency from the Lofargram and set it into the dial 50, signals from the simulator generator 11 will usually deviate from the center of the three cycle gate interval. As will presently appear, this deviation is utilized to control generator of the audio signal which the relator system 10 provides via lines 251, 252 and 253 to the Codar simulation record and playback means 15 so that the latter will provide the necessary signals to the recorder 14 to produce the Relatorgram.

To that end, the pulses from the Lofar simulation generator 11 are conveyed from lines 21, 22 and 23 by lines 91, 92 and 93 to emitter followers 94, 95 and 96, respectively, the outputs of which are connected by lines 97, 98 and 99 to Schmitt triggers 101, 102 and 103. The pulses from each of the Schmitt triggers 101, 102 and 103 are of the same standard amplitude and are applied via lines 105, 106 and 107, respectively, to an OR gate 110.

The output of OR gate 110 is connected via line 111 to the AND gate 89 where the Lofar simulation pulses are compared to the three cycle gate pulse from AND gate 87. If a target pulse occurs during the three cycle interval, an output signal indicative of the presence of a target frequency $f_1$ is produced by AND gate 89 and appears on line 114 which is connected to an AND gate 115. The output of AND gate 87 is also applied by line 116 to an AND gate 117 and by line 118 to an AND gate 119, all for a purpose described hereinafter.

The $f_1$ present signal from AND gate 89 is also conducted by a line 120, a one cycle delay means 121, and a line 122 to an AND gate 124 as an input thereto. The AND gate 124 has, as another input, target signal pulses conducted from OR gate 110 by lines 111 and 125. Still another input to AND gate 124 is the three cycle gate pulse conducted thereto via lines 88 and 126.

In the event an $f_1$ present pulse is produced at AND gate 89 as explained above, the delay means 121 is actuated to introduce a one cycle delay after which the AND gate 124 is enabled by the $f_1$ present signal to pass any other target signal pulse from OR gate 110 which happens to fall within the remainder of the three cycle gate pulse. If such a coincidence of events occurs, AND gate 124 provides on line 127 a signal indicating the presence of a second target frequency $f_2$. Line 127 is connected to an AND gate 115a, by line 128 to an AND 117a, and by line 129 to an AND 119a, also for a purpose later to be described.

Reverting now to the audio generator means 85, it will be recalled that the purpose thereof is to generate a sine wave audio signal to be used by the Codar simulator apparatus to produce the Relatorgram on the signal data recorder 14 and that the trainee selects the frequency to be generated from the Lofargram and sets it into the dial 50. Now, in the event the incoming Lofar simulation target signal from generator 11, as indicated by the frequency $f_1$ present signal, is not at the center of a 3 cps passband, the audio generator is automatically shifted to generate the correct frequency so that the resulting Relatorgram will be realistic and the training of the trainee more effective.

The audio generator means 85 comprises a crystal controlled oscillator 130, which in this example operates to provide an output signal of 1,141 kc, and is connected by conductor means 131 to a variable frequency divider means which is conveniently in the form of a twelve-stage counter 132. The counter 132 normally divides the output of oscillator 130 by a factor of $2^{12}$ or 4096. By means of a fixed amount of feedback through an amplifier 134 and conductor means 135, however, the counter 132 is initially set to divide by a factor of 3,392. In addition to this fixed feedback there is a variable feedback which is derived from the output of counter 132 and applied by conductor means 138 to variable feedback gating means 139 under the control of the first five stages 79a–79e of counter 79 acting through a storage register 140.

The variable division factor control signal applied to the first five stages 132a–132e of the counter 132 is initiated by the first five stages of the eleven-stage up-down counter 79 forming part of the three cycle gate generation means. The state of these stages 79a–79e changes every 1/10 cycle during the three cycle gate interval and, as explained above, if a target signal occurs during that interval the $f_1$ present signal is produced on line 114. At the same time, the count that is in the first five stages of the counter 79 is transferred to the storage register 140 which may consist of AND gates and flip-flops arranged in a conventional manner. The storage register 140 has two inputs, one from the first five stages of counter 79 and the other the $f_1$ present signal conducted from line 114 via line 141. Coincidence between these two inputs produces an output from the storage register 140. The resultant count transferred from the storage register 140 is a five-bit number representing the amount of deviation of the analyzed target signal from the center of the three cycle passband of the Relator. It should be recognized that this is done because an actual simulated target may not necessarily have the frequency dialed by the student into the Relate dial 50. This five-bit number controls the amount of feedback to the first five stages 132a–132e of the counter 132, thereby changing the division factor of the counter and the output frequency therefrom. If the feedback increases, the dividing factor of the counter 132 decreases, causing the output frequency of the counter to increase. The opposite effect occurs if the feedback decreases.

The output of the twelve-stage counter 132, conducted by lines 143, 144 is applied to a mixer 145, forming part of the audio generator means 85, as a first input. A second input to the mixer 145 is derived in the following manner.

The 104.44 to 144.4 local oscillator signal from the signal comparator 16, after amplification by amplifier 55 and shaping by Schmitt trigger 57 is applied to frequency divider counter 59. The counter 59 divides the signal of local oscillator 51 by a factor of 296, so that the output frequency from the counter varies from 352.838 cps to 487.838 cps, in the present example, as the relator dial 50 is tuned from 15 cps to 150 cps, respectively. The output signal from the counter 59 is coupled by lines 146, 146a to the mixer 145 for mixing with the output frequency of the twelve-stage counter 132. At this point it should be noted that since the counters 132 and 59 are conveniently comprised of flip-flops and will produce outputs in the form of pulses of the frequencies concerned, it will be necessary to convert the pulse frequencies to sine waves of corresponding frequencies in order for the mixer 145 (and hence the audio generator 85) to provide a sine wave output. The function of converting the pulses to sine waves is conveniently accomplished by suitable shaper means (not shown) in the input stages of the mixer 145. The mixer output is connected by line 147 to a 200 cps low pass filter 148.

The output of the mixer 145 consists of the characteristic, sum, difference, and carrier frequencies of the inputs. Of these frequencies, all but the difference frequency is suppressed by the filter 148, the output of which is the desired audio frequency output $f_1$ of the audio generator means 85 adjusted to correct for inaccuracies of the simulator equipment and/or student in setting a frequency into the dial 50.

As an example of the audio generator circuit operation, consider that the carrier output frequency of the counter 132 is 337.873 cps. If the Relator dial 50 is tuned to 15 cps, the local oscillator will operate at 104.44 kc. When the 104.44 kc signal is divided by 296 by counter 59, the input to the mixer 145 therefrom will be 352.838 cps. The difference between these inputs to the mixer is approximately 15 cps, which is easily passed by the 200 cps low pass filter 148. If the Relator dial 50 is tuned to 150 cps instead of 15 cps, the input from the counter 59 is at 487.939 cps, and when this is mixed with the 337.873 cps output of counter 132, the difference frequency is about 150 cps. Again, this signal is easily passed by the filter 148.

The audio generator means 85 further comprises circuitry for generating an audio output signal corresponding to a second frequency $f_2$ from the target signal generator 11 in response to the previously mentioned $f_2$ present signal on line 127 when the frequency $f_2$ falls within the three cycle interval and after a one cycle delay interval following an $f_1$ present signal from AND gate 89. Thus, the audio generator means 85 includes a second twelve-stage counter 152 which is identical to counter 132 and receives an input signal from the crystal oscillator 130 via lines 131 and 153. The counter division rate is controlled by the first five stages of the counter 79 through the agency of a storage register 155 and variable feedback gate means 156 having $f_2$ present and feedback inputs via conductor means 157 and 158 respectively.

The output of counter 152 is applied by conductor means 159, 160 as an input to a mixer 161 which has as a second input the output of the counter 59 via conductor means 146 and 162. The output of mixer 161 is connected by line 163 to a 200 cps, low pass filter 165 which suppresses all but the difference frequency, thereby providing on line 166 the audio frequency $f_2$ as an output of the audio generator means 85.

The $f_1$ and $f_2$ outputs of the audio generator means 85 are amplified and gated by means described hereinafter to the pair delay shaft positioning means of the Codar simulation variable delay magnetic record and playback means 15 for utilization thereby in providing signals to the recorder 14 for producing the Relatorgrams. To this end, Schmitt trigger 101 is connected by conductor means 170, 171 to AND gates 115 and 115a to convey T1 signal pulses as an input thereto, Schmitt trigger 102 is connected by conductor means 172, 173 to AND gates 117, 117a to convey T2 signal pulses as an input thereto, and Schmitt trigger 103 is connected by conductor means 174, 175 to AND gates 119, 119a to convey T3 signal pulses as an input thereto.

The $f_1$ present pulse from the gate generator means and the standard amplitude T1 pulse from Schmitt trigger 101 are compared in AND gate 115 and, when both are present, this AND gate provides an output on line 177 which connects AND gate 115 to a one-shot multivibrator 178 for triggering thereof. The one-shot multivibrator 178 is connected by line 180 to a relay driver circuit 181, best illustrated in FIG. 3, to which reference should now be had as the description continues.

Figure 3:
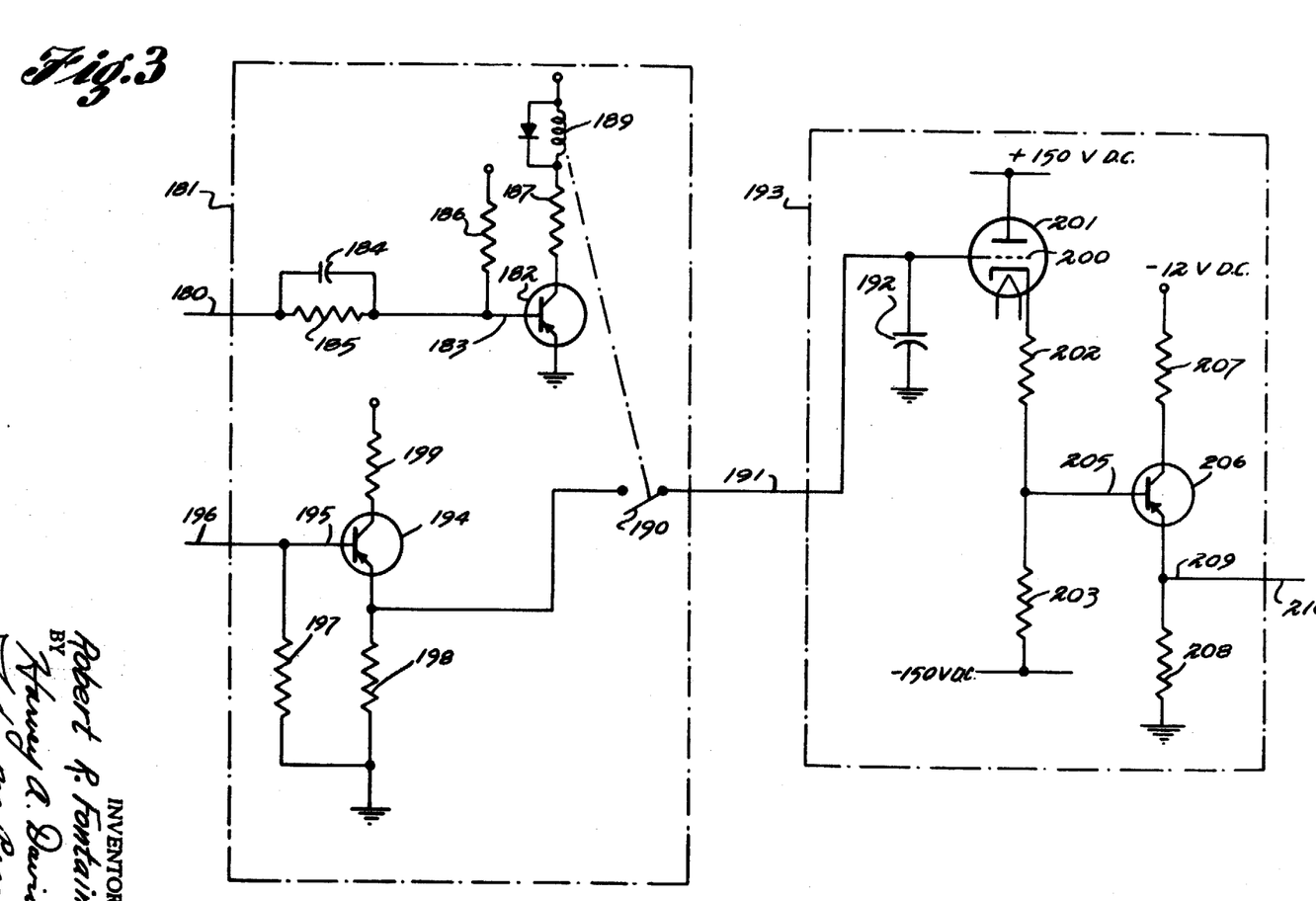
FIG. 3 is a schematic illustration of a portion of the system of FIGS. 2a and 2b.

The relay driver circuit 181 comprises a PNP transistor 182, the base connection 183 of which is coupled by capacitor 184 and resistor 185 to line 180 so as to be rendered conductive in response to triggering of the multivibrator 178 by a T1 pulse. The transistor 182 is suitably biased and ballasted by resistors 186 and 187, and upon being rendered conductive effects energization of relay coil 189 so as to close relay contacts 190.

The relay contacts 190 remain closed the duration of the T1 pulse (about 3 milliseconds). The amplitude of the T1 pulse, however, is held in a capacitor 192, forming part of a hold circuit 193, for one analyzer sweep interval. Thus, a PNP transistor 194, which conveniently forms part of the relay driver circuit 181, has its base connection 195 connected to amplifier 94 through lines 97 and 196. The transistor 194 is suitably biased by resistors 197, 198, 199, so as to provide to the capacitor 192, during the closed period of the contacts 190, a signal corresponding to the amplitude of the T1 signal. It will be noted in this regard that the T1 signal passed by transistor 194 to capacitor 192 has not been subjected to the standard amplitude treatment of the Schmitt trigger 101.

The amplitude of the T1 signal is stored on the capacitor 192 of the hold circuit 193 which is connected to the grid 200 of a triode vacuum tube 201. The latter is biased by series connected cathode resistors 202, 203 which form a voltage divider to provide a control voltage to the base connection 205 of a PNP transistor 206. The transistor 206 is connected as an amplifier in common emitter configuration with emitter and collector resistors 207 and 208 and the output taken from the emitter connection 209 on line 210 connected to a variable gain amplifier 213.

The output of the hold circuit 193 is utilized to control the variable gain amplifier 213 which serves to amplify the $f_1$ audio output of the audio generator means 85 in accordance with the intensity (amplitude) of the T1 target signal from the Lofar simulation generator 11.

The output of the variable gain amplifier 213 is conducted on line 214 to a junction 216 with the T1 output line 251 of the relator simulator system 10.

Connected by line 220 to the output of AND gate 115 is a NOR gate 221 which has its output connected by line 222 to a detector circuit 223 which in turn has its output connected by line 224 to a relay driver circuit 226. The latter has its output connected by conductor means 227 to a relay 228. The relay 228 comprises normally open contacts 229 connected between the output line 214 of the variable gain amplifier 213 and ground. This detector, relay driver and relay circuit are operable to shut off the $f_1$ output of the variable gain amplifier 213 in the event the T1 pulse is not present in the incoming signals from the Lofar simulator. As long as $f_1$ audio is present in incoming T1 target pulses, relay 228 remains deenergized, allowing the $f_1$ audio to proceed from the variable gain amplifier to the appropriate pair delay shaft input of the Codar simulation means 15.

Connected to the output of AND gate 115a, the inputs of which it will be recalled are T1 pulses and $f_2$ present signals, are circuits and conductor lines corresponding to those connected to the output of AND gate 115, and are referenced by corresponding reference numerals with the suffix "a" added. The foregoing explanation of the elements associated with AND gate 115 may be applied as well to the elements associated with the AND gate 115a and further explanation is believed unnecessary. Suffice it to say that the $f_2$ output of variable gain amplifier 213a on line 214a connected to junction 216 varies as a function of the amplitude of the T1 pulse at the hold circuit 193a.

It will be understood that similar circuitry (not shown) is associated with the AND gates 117, 117a to provide $f_1$ and $f_2$ audio for T2 target pulses as a Relator output via line 53, and that similar circuitry is associated with the AND gates 119, 119a to provide $f_1$ and $f_2$ audio as a T2 target output of the Relator on line 53.

From the foregoing detailed description of the invention and its association with equipment served thereby, it will be recognized that the previously stated objects and advantages have been accomplished by the invention.

Obviously many modifications and variations of the present invention are possible in the light of the above teachings. It is therefore to be understood that within the scope of the appended claims the invention may be practiced otherwise than as specifically described.

What is claimed is:

1. In simulation apparatus including Lofar simulation means for producing pulses characteristic of simulated target signals, Codar simulation means including a pair delay shaft positionable in response to an input for producing signals simulating outputs of Codar sonobouy pairs, and signal data recorder means connected by spectrum analyzer means to said Lofar simulation means and connected by signal comparator means to said Codar simulation means so that said apparatus can be selectively operated to produce graphic presentations of simulated target signal frequencies, target bearings, relation of target frequency to target bearing, said apparatus further including dial means for manually selecting a target signal frequency from the graphic presentation of frequencies as an input to the apparatus; the improvement comprising:
   a relator simulator system connected to receive said Lofar simulation pulses, synchronizing pulses from said spectrum analyzer, and an oscillator signal from local oscillator means tuned by setting of said dial means to provide a local oscillator frequency; said relator system being operative to provide audio signals corresponding to said simulated target signal frequencies irrespective of inaccuracies in setting of said dial means, said relator system being connected to said Codar simulation means for providing said audio signals thereto whereby said recorder means can provide graphic presentation of the relation of a selected frequency to the simulated target from which the frequency emanated;
   said relator simulator system comprising a three cycle gate generator for generating gating signals of a width corresponding to three cycles of a dialed frequency;
   audio generator means for producing said dialed frequency; and
   audio gate means;
   said three cycle gate signals being operative to enable said pulses from said Lofar simulation means to control said audio generator means to produce the selected frequency; and
   said audio gate means being responsive to the presence of simulated target signals to pass the audio signals from said generator means to said Codar simulation means.

2. Apparatus as defined in claim 1 and wherein said three cycle gate means comprises:
   second oscillator means for providing signals of a predetermined frequency,
   mixer means connected to said local oscillator means and to said second oscillator means and operative to provide signals at a frequency proportional to the dialed frequency;
   AND gate means connected to said mixer, said AND gate means being adapted to receive a timing signal and signals from said mixer and being operative to pass said signals at a frequency proportional to said dialed frequency for a predetermined time period;
   up-down binary counter means connected to said AND gate means so as to be loaded during said time period at a count rate proportional to the dialed frequency;
   second AND gate means for producing said three cycle gate signal in response to loading of a predetermined portion of said binary counter means; and
   storage register means connected to another portion of said binary counter for storing a count corresponding to said signals at a frequency proportional to said dialed frequency.

3. Apparatus as defined in claim 2 and wherein said audio generator means comprises:
   third oscillator means for providing signals of a fixed frequency;
   variable frequency divider means connected to said third oscillator means for dividing said fixed frequency by a factor varied in response to the count present in said storage register to provide a sine wave output;
   third AND gate means responsive to target signals from said Lofar simulation means and to said three cycle gate signals to provide frequency present signals indicative of the presence in said target signals of a frequency corresponding to the dialed frequency and within the width of said three cycle gate signal;
   said storage register being responsive to said frequency present signals from said third AND gate means to effect control of said variable frequency divider means.

4. Apparatus as defined in claim 3 and:
   a fixed frequency divider connected to said local oscillator and operative to provide a frequency proportional to the local oscillator frequency;
   a mixer connected to said variable frequency divider and to said fixed frequency divider and operative to combine the outputs thereof to provide an audio output signal of a frequency corresponding to the dialed frequency present in said target signals.

5. Apparatus as defined in claim 4 and wherein said audio gate means comprises:
   fourth AND gate means connected to said Lofar simulation means and to said third AND gate means and operable to provide an output upon coincidence of said target signals and said frequency present signals;
   holding circuit means operable in response to the output of said fourth AND gate means to provide an output which varies with the amplitude of said target signals;
   a variable gain amplifier connected to said holding circuit means and to said audio generator for amplifying said sine wave output thereof in response to the output of said holding circuit means;
   the output of said variable gain amplifier being connected to be the pair delay shaft input of said Codar simulation means for utilization in relating said target frequencies to target bearings.

6. Apparatus as defined in claim 5 and wherein said audio gate means further comprises:

NOR gate means connected to said fourth AND gate means to provide an output when the output of said fourth AND gate is absent;

relay means;

detector means connected to said NOR gate and responsive to the output thereof to activate said relay means;

said relay means having normally open contact means connected between the output of said variable gain amplifier means and ground, whereby closing of said contacts in response to absence of target signal input to said fourth AND gate will shut off output of said variable gain amplifier to said pair delay shaft.

* * * * *